(12) United States Patent
Zhai et al.

(10) Patent No.: US 8,965,118 B2
(45) Date of Patent: Feb. 24, 2015

(54) REDUCING CHROMATIC ABERRATION

(75) Inventors: Jiefu Zhai, Cupertino, CA (US); Zhe Wang, Plainsboro, NJ (US); Tao Zhang, Sunnyvale, CA (US)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 13/576,805

(22) PCT Filed: Feb. 7, 2011

(86) PCT No.: PCT/US2011/000224
§ 371 (c)(1),
(2), (4) Date: Aug. 2, 2012

(87) PCT Pub. No.: WO2011/097038
PCT Pub. Date: Aug. 11, 2011

(65) Prior Publication Data
US 2012/0308134 A1    Dec. 6, 2012

Related U.S. Application Data

(60) Provisional application No. 61/337,703, filed on Feb. 8, 2010.

(51) Int. Cl.
*G06K 9/00* (2006.01)
*G06K 9/32* (2006.01)
*H04N 9/04* (2006.01)
*G06K 9/34* (2006.01)

(52) U.S. Cl.
CPC ........................... *H04N 9/045* (2013.01)
USPC .......................... 382/167; 382/294

(58) Field of Classification Search
USPC ......... 382/154, 162, 164, 165, 194, 218–220; 355/43; 356/401
See application file for complete search history.

(56) References Cited

U.S. PATENT DOCUMENTS 4,782,368 A * 11/1988 Ogawa et al. .................. 355/43
5,094,539 A *  3/1992 Komoriya et al. ........... 356/401
5,170,441 A    12/1992 Mimura et al.
(Continued)

FOREIGN PATENT DOCUMENTS

EP    2101207    9/2009

OTHER PUBLICATIONS

Wang et al: "Single Image Chromatic Aberration Reduction With Robust Local Displacement Estimation", Proceeding of ICIP2010, Sep. 26-29, 2010.
(Continued)

*Primary Examiner* — Amir Alavi
(74) *Attorney, Agent, or Firm* — Robert D. Shedd; Brian J. Cromarty

(57) ABSTRACT

A system and method for reducing chromatic aberration by aligning pixel in a color channel according to displacement from corresponding pixels in another color channel. In particular, the system calculates a feature, such as intensity, for a first block of pixels in a first color channel of an image. The feature is calculated for a second block of pixels in a second color channel of the image. Displacement is estimated between the first color channel and the second color channel by comparing the feature for the first block and the feature for the second block. At least a portion of the first color channel is aligned with at least a portion of the second color channel based on the estimated displacement.

25 Claims, 6 Drawing Sheets

(56) References Cited

U.S. PATENT DOCUMENTS

2008/0259201 A1    10/2008  Iijima et al.
2012/0082370 A1*    4/2012  Yasukawa et al. ............ 382/154
2012/0308134 A1*   12/2012  Zhai et al. .................... 382/167

OTHER PUBLICATIONS

Kang et al: "Automatic Removal of Chromatic Aberration from a Single Image", Microsoft Research, 2010.

Mallon et al: "Calibration and Removal of Lateral Chromatic Aberration in Images"; Visions System Group, Ireland; Jan. 17, 2006.

Boult et al: "Correcting Chromatic Aberrations Using Image Warping", Dept. of Computer Science, New York, 1992 IEEE, pp. 684-687.

Chung et al: "Detecting and Eliminating Chromatic Aberration in Digital Images": Div. of Electronic and Electrical Eng. Korea, 2009 IEEE, pp. 3905-3908.

Viola et al: "Rapid Object Detection using a Boosted Cascade of Simple Features"; 2001 IEEE, pp. I-511-I-518.

Cecchetto: "CPSC525 Correction of Chromatic Abberration from a Single Image Using Keypoints", Dept. of Computer Science, Univ. of British Columbia, 2003.

Search Report Dated Apr. 27, 2011.

\* cited by examiner

REDUCING CHROMATIC ABERRATION

CROSS-REFERENCE TO RELATED APPLICATIONS

This application claims the benefit, under 35 U.S.C. §365 of international Application PCT/US2011/000224, filed Feb. 7, 2011, which was published in accordance with PCT Article 21(2) on Aug. 11, 2011 in English and which claims the benefit of U.S. provisional patent application No. 61/337,703, filed Feb. 8, 2010.

TECHNICAL FIELD

Implementations are described that relate to image processing. Various particular implementations relate to reducing chromatic aberration in one or more images.

BACKGROUND

The advances of modern imaging techniques enable acquisition of images and video with very high resolution in professional as well as consumer equipment. Especially, the rapid development of CMOS and CCD imaging sensors has achieved higher resolution than what modern films can typically achieve. However, high resolution sensors are usually more intolerant to faults in the optical design of a lens system. Various problems can be exhibited in high resolution images or video, one of which is chromatic aberration (CA), also known as color fringing. CA often can be easily observed with inexpensive optics or with aperture wide-opened.

CA is a phenomenon in an image system in which the different colors focus on different points due to different refraction. For example, different wavelengths of light may refract differently through different parts of a lens system. Thus, the multiple color channels may not align with each other as they reach the sensor or film. There are typically two kinds of chromatic aberration: axial chromatic aberration (ACA) and lateral chromatic aberration (LCA). In ACA, different colors focus differently in the optical axis direction, which results in a blurred image. While in LCA, different colors focus on different points in the image plane, which results in colored edges in high contrast regions. It is generally difficult to distinguish the blurred effects caused by ACA from other factors such as out of focus. In contrast, LCA is often easily visible in images. One or more implementations in this application address LCA, although implementations may be applicable to ACA as well.

SUMMARY

According to a first general aspect, a feature is calculated for a first block of pixels in a first color channel of an image. The feature is calculated for a second block of pixels in a second color channel of the image. Displacement is estimated between the first color channel and the second color channel by comparing the feature for the first block and the feature for the second block. At least a portion of the first color channel is aligned with at least a portion of the second color channel based on the estimated displacement.

According to a second general aspect, a processor readable medium has stored thereon instructions for causing one or more processors to collectively perform the first general aspect.

According to third general aspect, an apparatus is provided for performing the first general aspect.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

At least one implementation in this application reduces CA for a single image, based on a single image. Additionally, the implementation reduces CA artifacts without any prior information from calibration. The implementation uses an image registration approach to align different color channels such that CA can be compensated. A similarity metric is provided to estimate the displacement between pixels in different color channels and align them effectively.

There is a long history of research on how to correct chromatic aberration. Roughly, the CA correction methods can be divided into two groups in terms of image formation. The first category of methods is done before image formation, as represented by sophisticated lens designs to remove CA directly. This approach may produce expensive lenses. Even for expensive lenses used in film shooting, however, CA is often observed, especially when zoom lenses are used. The second category of methods corrects CA after image formation.

CA can often be observed around edges of objects. CA often manifests itself as a visible coloration on an edge. For example, one edge of a tree branch may show a green fringe or a purple fringe. Generally speaking, CA can be well modeled as spatially varying translation motion between different color channels. In order to eliminate or reduce CA, at least one implementation uses the green channel of an image as a reference and aligns the red and blue channels to the green channel. This idea has similarities to image registration or motion estimation in many computer vision problems. Two different color channels are treated as two grey images and the local motion between the two images is estimated. Conceptually, local displacements define a dense two-dimensional vector field, which has similarities to optical flow. After local displacements between color channels are estimated, a motion warping is applied (that is, the pixels of a color channel are displaced) to compensate for misalignment between color channels. One challenge here is how to robustly register different color channels without any prior information from calibration.

Figure 1:
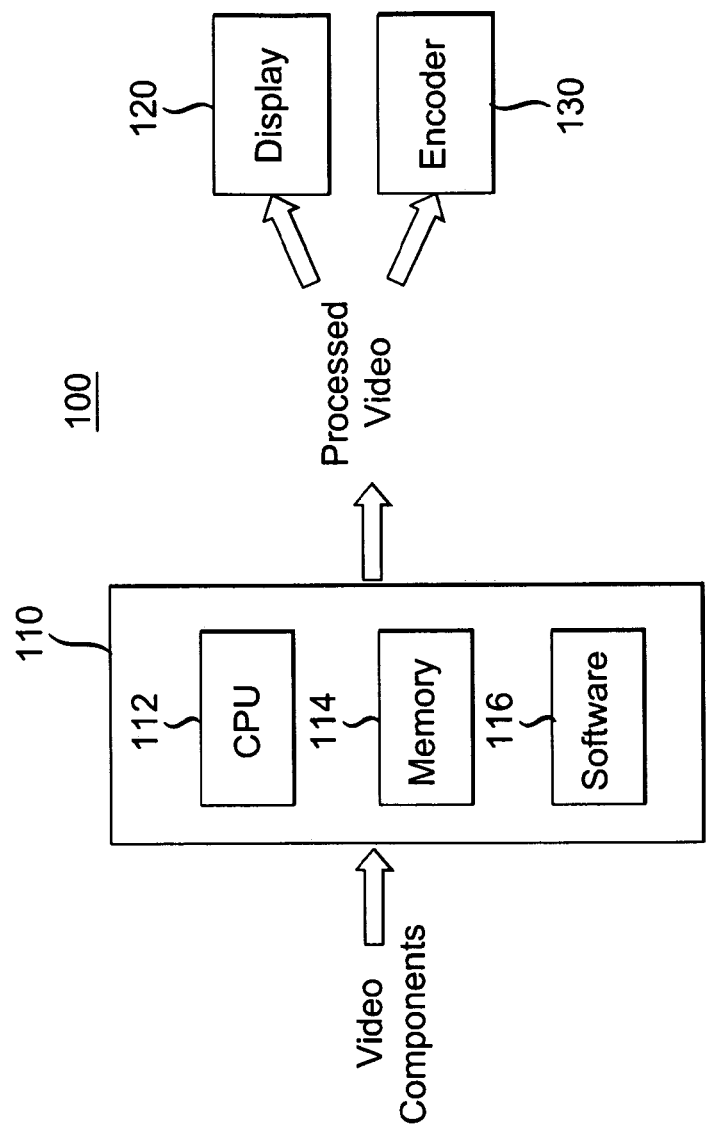
FIG. 1 is a block/flow diagram depicting an example of a system for processing a color channel of an image.

Referring to FIG. 1, a system 100 is provided that processes video images to reduce chromatic aberration according to one or more of the algorithms provided in this application. The system 100 includes a processor 110 that receives input video components. The video components are, for example, color channels of images of a video sequence. The processor 110 includes a central processing unit ("CPU") 112, a memory 114, and a software module 116. The software module 116 may be, for example, an application or a code module for implementing one or more of the algorithms described in this application. The CPU 112, the memory 114, and the software module 116 are all communicatively coupled in one of various manners. In one implementation, the software module 116 is stored on the memory 114, and the software module 116 is executed on the CPU 112.

The system 100 also includes a display 120 and an encoder 130. The display 120 and the encoder 130 each receive processed video from the processor 110. The processed video has reduced chromatic aberration compared to the video components. The processed video may be, for example, a green channel, and a displaced version of the red and blue channels, as indicated above. The display 120 displays the processed video, and the displayed video may be viewed, for example, by a user. The encoder 130 encodes the processed video. The encoder 130 may provide the encoded video to, for example, a transmission or storage device (not shown).

Figure 2A:
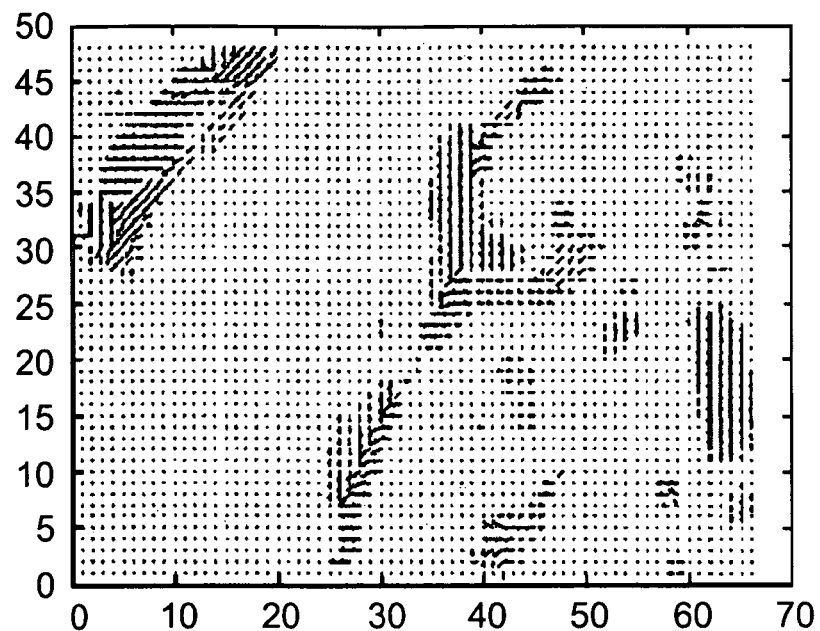
FIG. 2A is an example of a motion field between two color channels.
Figure 2B:
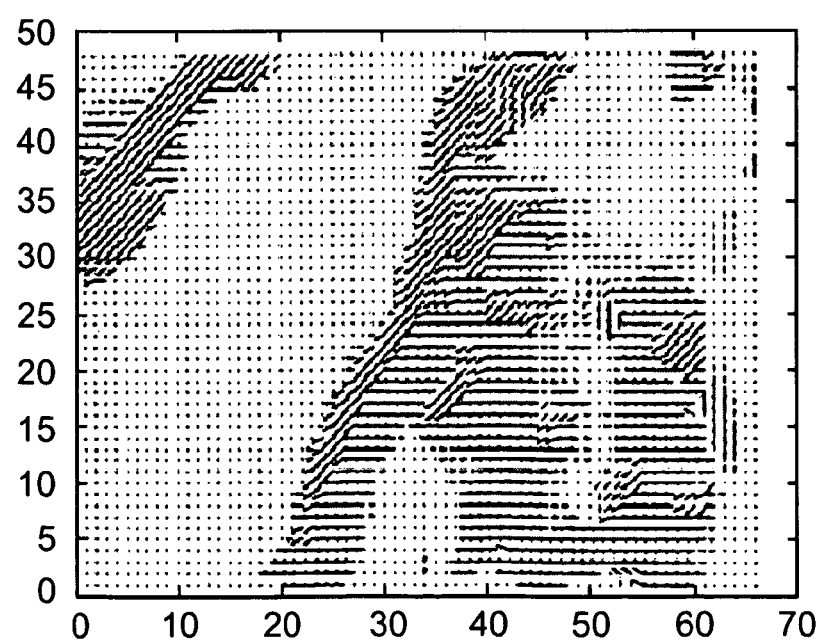
FIG. 2B is another example of a motion field between two color channels.

Referring to FIGS. 2A and 2B, two motion fields are provided. FIG. 2A depicts a motion field between a blue channel and a green channel for an image. FIG. 2B depicts a motion field between a red channel and the green channel for the image. The motion fields include vectors (displacements) for each pixel. As shown in FIGS. 2A and 2B, the direction of relative displacement is shown using directional line segments. More specifically, for each pixel in a channel, we find the relative displacement to the same pixel in the reference (green, in this example) channel. The displacement is shown in FIGS. 2A and 2B. The displacement is directional and may be represented as positive values or negative values if we define the positive directions. In FIGS. 2A and 2B, arrow heads represent the directions. In FIGS. 2A and 2B, most pixels have zero values, meaning no local displacement is found. As can be seen, the motion fields for both the red and blue components have certain similarities. For example, positive motion is indicated in the same general regions. Additionally, as can be seen, the motion fields have zero motion for many pixel locations.

In at least one implementation described in this application, a new similarity metric for color image alignment is provided. To define such a similarity metric, various implementations use one or more characteristics that are invariant, or substantially invariant, across different color channels. The inventors have determined that the relative relationship between the pixel intensity of a given pixel location and the average pixel intensity over a small patch around the given pixel location is considerably consistent across color channels. To exploit this consistency, we define a "feature bit" for each pixel as below:

$$f_c(x, y) = \text{sign}\left(I_c(x, y) - \frac{1}{MN} \sum_{(x_i, y_i) \in G(x,y)} I_c(x_i, y_i)\right) \quad (1)$$

Where:
c is a subscript for color channel.
I(x,y) is the intensity of the pixel located at (x,y) in the image for the color channel c.
G(x,y) is a rectangular area around the pixel centered at (x,y).
M and N are the width and height of this rectangle, respectively.
The function "sign(.)" is defined as:

$$Y = \text{sign}(X) \quad (2)$$
$$\text{where } Y_i = \begin{cases} 1 & \text{if } X_i > 0, \\ 0 & \text{if } X_i <= 0. \end{cases}$$

This feature bit is defined for every pixel in all color channels. The inventors have determined that this feature bit is consistent across different color channels, assuming proper registration (alignment) of the color channels, with a very high probability. Based on this observation, a similarity metric for color channel alignment is defined. Suppose there are two rectangular blocks A and B from two different color channels, the similarity between two blocks is defined as below:

$$S_{pq}(A, B) = \sum_{(x,y) \in \text{block}} XOR(f_p(x, y), f_q(x, y)) \quad (3)$$

Where:
p and g are the subscripts for the color channels.
$f_p(x,y)$ and $f_q(x,y)$ are Equation 1 for color channels p and q, respectively.
The XOR(.) function is the logical operation of exclusive disjunction, having the following truth table:

| XOR | 0 | 1 |
| --- | --- | --- |
| 0 | 0 | 1 |
| 1 | 1 | 0 |

For this implementation, the new similarity metric introduced above is used to compute displacements for every pixel in an efficient manner. More specifically, for each pixel, in one implementation the following steps are used to estimate the displacement.

Figure 3:
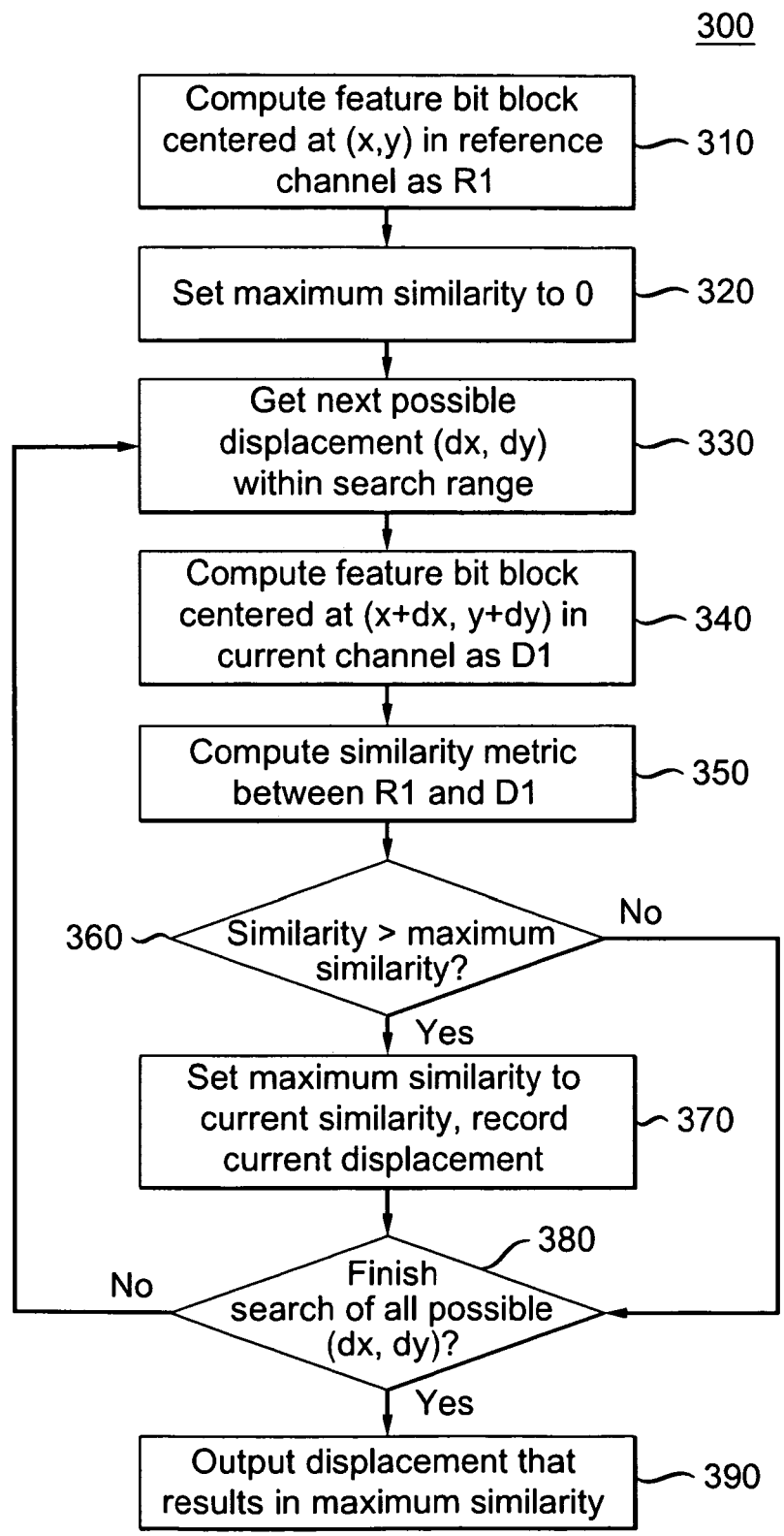
FIG. 3 is a block/flow diagram depicting an example process for estimating displacement for a pixel.

Referring to FIG. 3, a block/flow diagram is provided that depicts a process 300. The process 300 provides an implementation for estimating displacement for a single pixel. The process 300 is applied to a pixel at location (x,y).

The process 300 includes forming a square reference block R centered at (x,y) from the green channel and computing a feature bit for each pixel in block R to get a binary feature block R1 of feature bits (310). The feature bits may be computed using, for example, Equation 1 above.

The process 300 includes setting the maximum similarity to zero (320). The corresponding displacement is set equal to zero as well. The maximum similarity, and its corresponding displacement, operate as variables that are potentially updated during the process 300.

The process 300 includes getting the next possible displacement (dx,dy) within a search range (330). For that next available displacement in the search range, the process 300 includes forming a square block D in the color component under consideration. Block D is centered at (x+dx,y+dy) where (dx, dy) is the displacement. A feature bit is then computed for each pixel in block D to get a binary feature block D1 of feature bits (340).

The process 300 includes computing a similarity metric between feature block R1 and feature block D1 (350). In one implementation, computing the similarity metric includes computing a pixel-wise XOR between R1 and D1 and summing up the number of 1's in the resulting matrix, as shown in Equation 3. In another implementation, the inverse XOR is used in Equation 3 instead of XOR. It will be understood that the XOR function and the inverse XOR function provide essentially the same information. The truth table for the inverse XOR is:

| Inverse XOR | 0 | 1 |
|---|---|---|
| 0 | 1 | 0 |
| 1 | 0 | 1 |

In order to compute the similarity metric for this implementation using Equation 3, corresponding block locations are combined with the inverse XOR operation. For example, in one implementation, the XOR operation of Equation 3, within the summation, is replaced with the following inverse XOR operation:

$$\text{Inverse XOR}(f_p(x,y), f_q(x+dx, y+dy))$$

where,
p is a subscript indicating the reference color channel, and
q is a subscript indicating the current color channel.

The process 300 includes determining if the similarity metric computed for feature blocks R1 and D1 is greater than the maximum similarity (set to zero in operation 320; updated potentially in operation 370) (360). If the similarity metric is greater than the maximum similarity, then the maximum similarity is set equal to the similarity metric, and the current displacement (dx,dy) is recorded as the corresponding displacement (370). The process 300 then proceeds to operation 380, described below.

If the similarity metric is not greater than the maximum similarity in operation 360, then the process 300 continues with operation 380, described below.

The process 300 includes determining if all possible displacements (dx,dy) have been searched (380). If all possible displacements have not been searched (operation 380 produces a "no"), then the process 300 jumps back to operation 330. This has the effect of assessing all possible displacements, and determining the displacement that leads to the maximum value for the similarity metric. After all possible displacements have been searched (operation 380 produces a "yes"), the process 300 continues to operation 390, described below.

The process 300 includes outputting the corresponding displacement that produces, or results in, the maximum similarity (390).

In another implementation of the process 300, Equation 3 is used with the XOR function, and the process 300 attempts to minimize the similarity produced by Equation 3. More specifically, the following equation is used: $XOR(f_p(x,y), f_q(x+dx, y+dy))$. With this equation, the process 300 of FIG. 3 is modified to produce the estimated displacement(s). In particular, the operation 320 is modified to set a minimum similarity to the highest possible value. The decision in the operation 360 is modified to determine whether the similarity is less than the minimum similarity. If the decision in the operation 360 is "yes", then the operation 370 is modified to set the minimum similarity to the current similarity. Finally, the operation 390 is modified to output the displacement that results in the minimum similarity.

The algorithm of FIG. 3 provides advantageous implementations, and can be applied to every pixel in an image in a process of reducing chromatic aberration. However, the inventors have further determined that running the process 300 on every pixel directly may result in unnecessary computations. Accordingly, two variations are now described that reduce the complexity with minor, or no, impact on the precision.

Regarding the first variation, note that the production of displacements for pixel locations according to the process 300 is equivalent to producing a motion field as shown in FIGS. 2A and 2B. However, the inventors have determined that production of a dense motion field for all pixels is usually not necessary due to the typically smooth changes in a motion field. Accordingly, in at least one implementation, a uniform sub-sampled set of pixel locations is chosen and their displacements are estimated. The displacements for the rest of the pixels are interpolated from the available neighboring pixels.

Regarding the second variation, note that in the computation of the similarity metric, both Equation 1 and Equation 3 contain operations that sum over a rectangular block in a matrix. Because the operation of summing over a rectangular block is repeated for every pixel in the image, one or more implementations accelerate this computation by employing an image that is referred to herein as an integral (or summed) image.

For example, instead of computing the feature bits one by one, the whole feature bit image is calculated. To do that, a summed image SI is calculated, which is defined as:

$$SI(x, y) = \sum_{0 < i < x} \sum_{0 < j < y} I(i, j) \quad (4)$$

The above summed image SI can be efficiently computed in the form below:

$$SI(x, y) = \begin{cases} I(x, y) & \text{if } x = 0, y = 0 \\ SI(x-1, y) + I(x, y) & \text{if } x \neq 0, y = 0 \\ SI(x, y-1) + I(x, y) & \text{if } x = 0, y \neq 0 \\ SI(x-1, y) + SI(x, y-1) \\ -SI(x-1, y-1) + I(x, y) & \text{otherwise} \end{cases} \quad (5)$$

Once the summed image is obtained, the calculation of average image intensity as used in Equation 1 is simplified. Specifically, the summation in Equation 1 for a block, G, extending from (x0,y0) to (x1,y1), can be determined from SI(x1,y1)−SI(x0,y1)−SI(x1,y0)+SI(x0,y0). If the whole summed image, SI, is calculated in advance, then the feature bit image can be calculated quickly.

Figure 4:
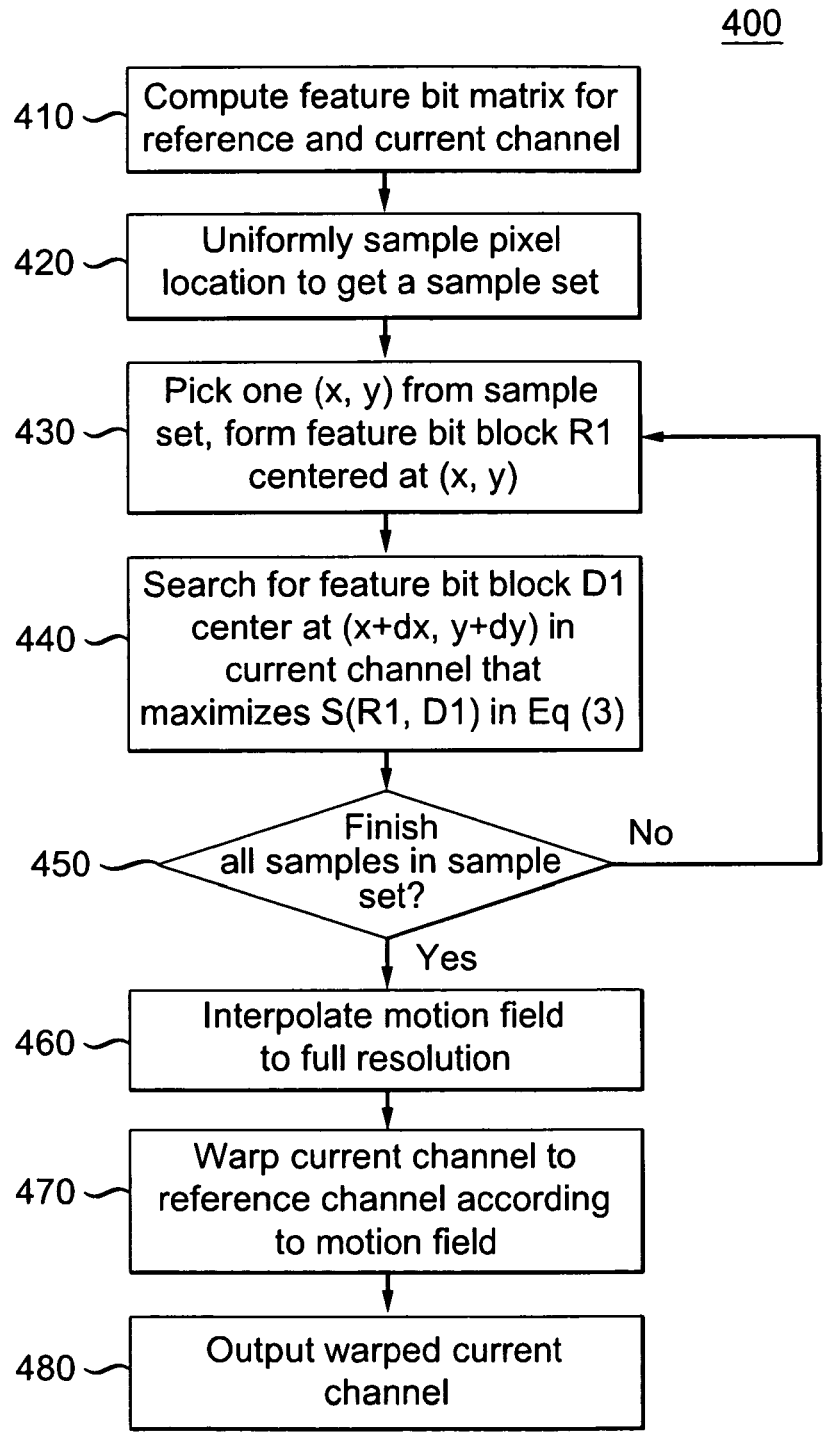
FIG. 4 is a block/flow diagram depicting an example process for reducing chromatic aberration for a color channel.

Incorporating the above two refinements, one implementation provides a CA reduction algorithm as provided in FIG. 4 and described below. Referring to FIG. 4, a block/flow diagram is provided that depicts a process 400. The process 400 provides an implementation for reducing CA for a color channel of an image.

The process 400 includes computing a feature bit matrix for a reference color channel, and computing a feature bit matrix for a current color channel (410). The feature bit matrix is computed, in one or more implementations, using Equation 1, which may use Equations 4 and 5 to use the integral image technique. In one implementation, the reference color channel is green, and the current color channel is either blue or red.

The process 400 includes uniformly sampling the pixel locations to obtain a sampled set (420). The process 400 performs, as described below, displacement estimation for each of the sampled pixel locations, rather than for all of the pixel locations.

The process 400 includes (i) selecting a pixel (x,y) in the sampled set, and (ii) forming a feature bit block R1 from the reference channel (430). The feature bit block R1 is a block drawn from the feature bit matrix created in operation 410. The feature bit block R1 is centered on the selected pixel (x,y).

The process 400 includes finding the displacement (dx,dy) in the current color channel, using the feature bit matrix for the current color channel created in the operation 410, that will result in a maximized similarity metric according to Equation 3 (440). The operations 430-440 are performed, in one or more implementations, using the process 300.

The process 400 includes determining whether all samples in the sample set have been processed (450). If all samples in the sample set have not been processed, then the process 400 returns to the operation 430 and selects another pixel (x,y) in the sample set. If all samples in the sample set have been processed, then the process 400 proceeds to the operation 460 described below.

The process 400 includes interpolating the estimated displacements for the samples in the sample set to produce a full resolution set of displacements (460). That is, to produce an estimated displacement for every pixel location in the current color channel. The set of estimated displacements is also referred to as a motion field. In one implementation, the interpolation uses linear interpolation.

The process 400 includes warping the current color channel to the reference color channel according to the full resolution motion field obtained in the operation 460 (470). That is, the process 400 displaces the current color channel by the estimated displacements.

The process 400 includes providing the warped current color channel, from the operation 470, as output (480). In various implementations, the output is provided to one or more of a display, an encoder, or a transmitter.

Although not shown, in an implementation, the process 400 is performed again for the remaining color channel.

Figure 5:
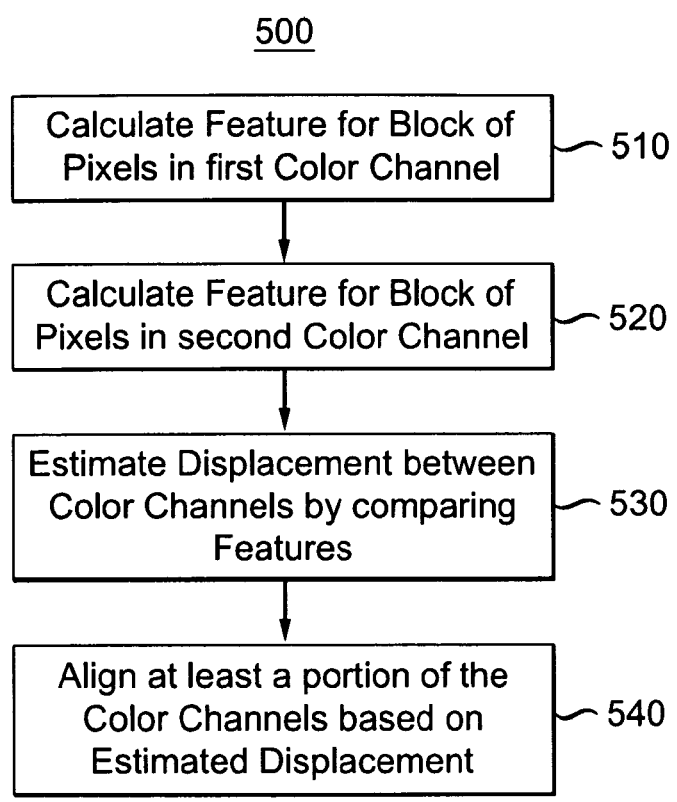
FIG. 5 is a block/flow diagram depicting an example process for aligning at least a portion of two color channels.

Referring to FIG. 5, a block/flow diagram is shown that depicts a process 500 for aligning at least a portion of two color channels. The process 500 includes calculating a feature for a first block of pixels in a first color channel of an image (510). The process 500 includes calculating the feature for a second block of pixels in a second color channel of the image (530). In one or more implementations, the features are feature bit blocks such as, for example, the feature bit blocks R1 and D1 computed in the operations 430 and 440 of the process 400.

The process 500 includes estimating displacement between the first color channel and the second color channel by comparing the feature for the first block and the feature for the second block (530). In one or more implementations, the features are compared by performing an XOR operation on feature bit blocks, as described for example in the processes 300 and 400. Depending on the value of the XOR result, the displacement of the second block of pixels may be taken as the estimated displacement.

The process 500 includes aligning at least a portion of the first color channel with at least a portion of the second color channel based on the estimated displacement (540). In one or more implementations, such as those described with respect to the processes 300 and 400, a given pixel of the second block of pixels is aligned with a corresponding pixel in the first block of pixels by displacing the given pixel by the estimated displacement.

In many practical applications, a local search among multiple possible displacement values will be fast enough to be useful. In other implementations, a smart guess is used for the displacement, and no search or a limited search is used. A smart guess may be determined by, for example, associating two channels by, for example, subtracting the two channels, then proceeding in the direction of the gradient descent as the search direction.

Figure 6:
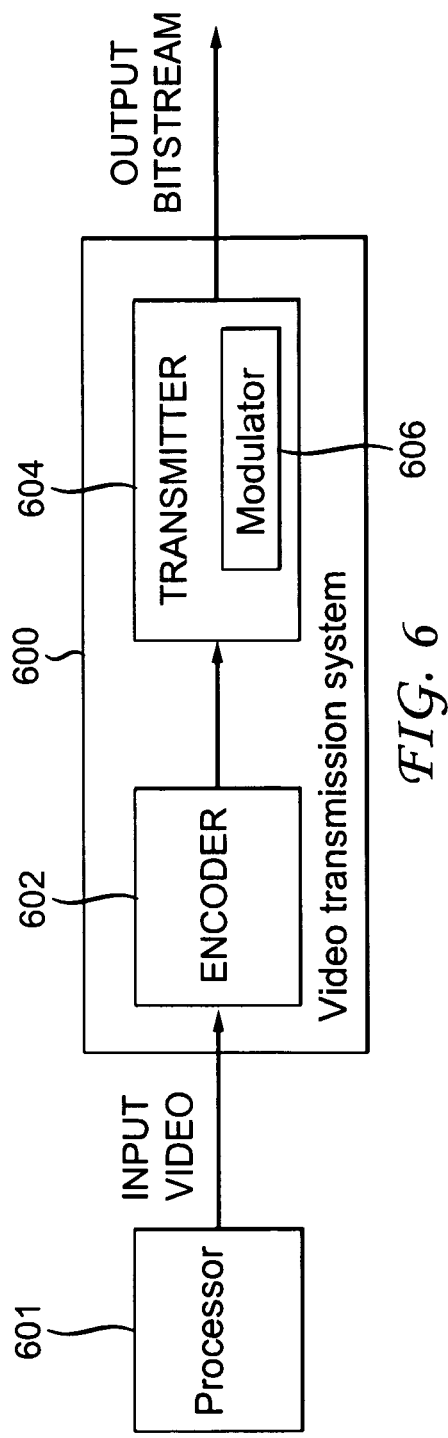
FIG. 6 is a block/flow diagram depicting an example of a video transmission system that may be used with one or more implementations.

Referring now to FIG. 6, a video transmission system/apparatus 600 is shown, to which the features and principles described above may be applied. The video transmission system 600 may be, for example, a head-end or transmission system for transmitting a signal using any of a variety of media, such as, for example, satellite, cable, telephone-line, or terrestrial broadcast. The transmission may be provided over the Internet or some other network. The video transmission system 600 is capable of generating and delivering, for example, video content and other content such as, for example, indicators of depth including, for example, depth and/or disparity values. It should also be clear that the blocks of FIG. 6 provide a flow diagram of a video transmission process, in addition to providing a block diagram of a video transmission system/apparatus.

The video transmission system 600 receives input video from a processing device 601. In one implementation, the processing device 601 simply provides to the video transmission system 600 original images that have not been corrected using a CA reduction algorithm. However, in another implementation, the processing device 601 is a processor configured for performing one or more of the CA reduction algorithms described in this application, and provided CA-reduced images to the video transmission system 600. Various implementations of the processing device 601 include, for example, processing devices implementing all or part of one or more of the processes 400 or 500. The processing device 601 may also provide metadata to the video transmission system 600 indicating whether CA has been reduced.

The video transmission system 600 includes an encoder 602 and a transmitter 604 capable of transmitting the encoded signal. The encoder 602 receives video information from the processor 601. The video information may include, for example, images and depth indicators. The encoder 602 generates an encoded signal(s) based on the video information. The encoder 602 may be, for example, an AVC encoder. AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264").

The encoder 602 may include sub-modules, including for example an assembly unit for receiving and assembling various pieces of information into a structured format for storage or transmission. The various pieces of information may include, for example, coded or uncoded video, coded or uncoded depth indicators and/or information, and coded or uncoded elements such as, for example, motion vectors, coding mode indicators, and syntax elements. In some implementations, the encoder 602 includes the processor 601 and therefore performs the operations of the processor 601.

The transmitter 604 receives the encoded signal(s) from the encoder 602 and transmits the encoded signal(s) in one or more output bitstreams. The transmitter 604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 606. The transmitter 604 may include, or interface with, an antenna (not shown). Further, implementations of the transmitter 604 may be limited to the modulator 606.

Figure 7:
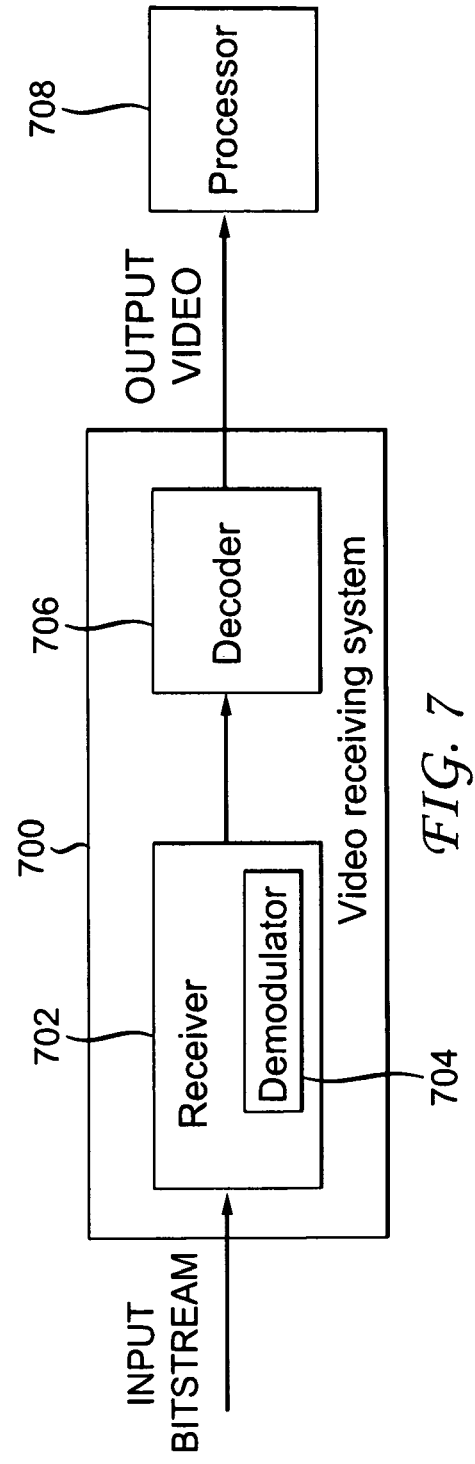
FIG. 7 is a block/flow diagram depicting an example of a video receiving system that may be used with one or more implementations.

Referring now to FIG. 7, a video receiving system/apparatus 700 is shown to which the features and principles described above may be applied. The video receiving system 700 may be configured to receive signals over a variety of media, such as, for example, satellite, cable, telephone-line, or terrestrial broadcast. The signals may be received over the Internet or some other network. It should also be clear that the blocks of FIG. 7 provide a flow diagram of a video receiving process, in addition to providing a block diagram of a video receiving system/apparatus.

The video receiving system 700 may be, for example, a cell-phone, a computer, a set-top box, a television, or other device that receives encoded video and provides, for example, decoded video for display to a user, for processing, or for storage. Thus, the video receiving system 700 may provide its output to, for example, a screen of a television, a computer monitor, a computer (for storage, processing, or display), or some other storage, processing, or display device. Additionally, the video receiving system 700 of many implementations is part of an image capture device such as a camera that can perform one or more of the described processes.

The video receiving system 700 is capable of receiving and processing video content including video information. The video receiving system 700 includes a receiver 702 for receiving an encoded signal, such as for example the signals described in the implementations of this application. The receiver 702 may receive, for example, a signal output from the video transmission system 600 of FIG. 6.

The receiver 702 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 704, de-randomizing the energy in the signal, de-interleaving the data in the signal, and error-correction decoding the signal. The receiver 702 may include, or interface with, an antenna (not shown). Implementations of the receiver 702 may be limited to the demodulator 704.

The video receiving system 700 includes a decoder 706. The receiver 702 provides a received signal to the decoder 706. The decoder 706 outputs a decoded signal, such as, for example, decoded video signals including video information. The decoder 706 may be, for example, an AVC decoder.

The output video from the decoder 706 is provided, in one implementation, to a processing device 708. The processing device 708 is, in one implementation, a processor configured for performing a CA reduction algorithm as described, for example, in one of the implementations described in this application. Note that the CA reduction algorithm is part of post-processing software. In another implementation, the received signal has already had a CA reduction algorithm performed, and so the CA reduction algorithm is not performed in the processing device 708.

In some implementations, the decoder 706 includes the processor 708 and therefore performs the operations of the processor 708. In other implementations, the processor 708 is part of a downstream device such as, for example, a set-top box or a television.

The implementations described in this application may be modified in various ways to produce further implementations. The following variations are exemplary and not exhaustive.

For example, in one or more implementations, in the operation 310 of the process 300, the reference block R is not square. In various implementations, the reference block R is rectangular, cross-shaped, or generally circular, and other variations are possible as well.

For example, in one or more implementations, Equation 1 uses an area G that is not rectangular. In various implementations, G is cross-shaped, or generally circular, and other variations are possible as well. The same variation applies to other areas and blocks described in other implementations.

For example, in one or more implementations, Equation 1 uses an area G that is not centered at the pixel (x,y). In various implementations, the pixel (x,y) is at a corner, along an edge, at a foci, or at another off-center interior location, and other variations are possible as well. The same variation applies to other areas and blocks described in other implementations (such as, for example, feature bit block R1 of the process 400).

For example, in one or more implementations, the complete summed image SI is not computed in advance of performing the CA reduction. In various implementations, SI is computed on an as-needed basis.

For example, in one or more implementations, the operation 420 in the process 400 need not perform sampling in a uniform manner. In various implementations, sampling is non-uniform Distortions, such as CA, often occur more frequently in boundary areas (far away from the center). Accordingly, one non-uniform sampling implementation samples more when the position is far away from the center. Such sampling will typically reduce computational time without too much of a penalty for lower accuracy.

For example, in one or more implementations, the operation 460 in the process 400 need not perform linear interpolation. In various implementations, the interpolation is non-linear. For example, the local transformation between a channel and a reference channel is not necessarily linear and in practice may be better represented by a nonlinear transformation (such as a transformation involving $x^2$ or $y^2$, if x and y are positions). Then non-linear interpolation may be used instead.

Various implementations described in this application include one or more of (1) an algorithm to reduce CA by estimating local displacement between color channels, or (2) a similarity metric to align different color channels robustly. Additionally, a signal containing data or descriptive information is generated in various implementations. In various implementations, such a signal includes, for example, all or part of a motion field generated from one or more of the implementations described in this application.

We thus provide one or more implementations having particular features and aspects. However, features and aspects of described implementations may also be adapted for other implementations. For example, different sampling methods may be used, different interpolating methods may be used, other video components (instead of, or in addition to, green) may be used as a reference, and/or feature bit blocks need not be centered exactly on the pixel for which displacement is being estimated.

Other implementations use characteristics other than the feature bit of Equation 1. For example, an implementation uses a ratio of pixel intensity and average intensity, rather than the difference as in Equation 1 (that is, this implementation uses Equation 1 without taking the sign and with a division rather than a subtraction). Additionally, another implementation uses the actual intensity difference between a pixel and the average intensity for a block, rather than just the sign of that difference as in Equation 1 (that is, this other implementation uses Equation 1 without taking the sign).

Additionally, those of skill in the art will appreciate that throughout this disclosure, we refer, for example, to "video" or "image" or "picture" or "video image". Such references may include any various video components or their combinations. Such components, or their combinations, include, for example, luminance, chrominance, Y (of YUV or YCbCr or YPbPr or YPcPr), U of (YUV), V (of YUV), Cb (of YCbCr), Cr (of YCbCr), Pb (of YPbPr), Pr (of YPbPr or YPcPr), Pc (of YPcPr), red (of RGB), green (or RGB), blue (of RGB), S-Video, and negatives or positives of any of these components. Further, these different types of components may be used with the described implementations. For example, a YPbPr set of components may be used with one or more described implementations, with Y (for example) being the reference component. Note that a color channel is a component.

Additionally, many implementations may be implemented in one or more of an encoder, a decoder, a post-processor processing output from a decoder, or a pre-processor providing input to an encoder. Further, other implementations are contemplated by this disclosure.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
calculating a feature for a first block of pixels in a first color channel of an image, the feature for the first block being independent of pixel values in a second color channel of the image;
calculating the feature for a second block of pixels in a second color channel of the image, the feature for the second block being independent of pixel values in the first color channel;
estimating displacement between the first color channel and the second color channel by comparing the feature for the first block and the feature for the second block; and
aligning at least a portion of the first color channel with at least a portion of the second color channel based on the estimated displacement.

2. The method of claim 1 wherein the first block is associated with a given pixel location in the first color channel.

3. The method of claim 2 wherein the second block is associated with a displaced pixel location in the second color channel.

4. The method of claim 3 wherein estimating displacement is for the given pixel location.

5. The method of claim 4 wherein aligning comprises aligning the given pixel location and the displaced pixel location.

6. The method of claim 1 wherein the feature is a substantially color-channel-invariant feature.

7. The method of claim 1 wherein the feature is based on intensity.

8. The method of claim 7 wherein the feature is further based on average intensity of block.

9. The method of claim 8 wherein the feature indicates a relationship between the intensity and the average intensity for each pixel in the block.

10. The method of claim 1 wherein comparing the feature comprises comparing for each pixel in the block.

11. The method of claim 10 wherein comparing comprises summing a value for each pixel of a block.

12. The method of claim 1 wherein aligning reduces a chromatic aberration.

13. The method of claim 12 wherein the chromatic aberration is a lateral chromatic aberration.

14. The method of claim 1 wherein estimating displacement further comprises estimating the displacement to be the displacement of the displaced pixel location relative to the given pixel location.

15. The method of claim 1 wherein aligning comprises shifting a pixel at the displaced pixel location in the second color channel by the estimated displacement.

16. The method of claim 1 wherein the method is performed before encoding.

17. The method of claim 1 wherein the method is performed after decoding.

18. The method of claim 1 further comprising calculating the feature for a third block, the third block surrounding a different displaced pixel location in the second color channel, and wherein:
comparing the feature for the first block and the feature for the second block produces a second-block result, and
estimating displacement further comprises:
comparing the feature for the first block and the feature for the third block to produce a third-block result,
comparing the second-block result and the third-block result to produce a comparison, and
determining, based on the comparison, that the displaced pixel location provides a better estimate of the displacement that the different displaced pixel location.

19. An apparatus comprising one or more processors collectively configured to perform:
calculating a feature for a first block of pixels in a first color channel of an image, the feature for the first block being independent of pixel values in a second color channel of the image;
calculating the feature for a second block of pixels in a second color channel of the image, the feature for the second block being independent of pixel values in the first color channel;
estimating displacement between the first color channel and the second color channel by comparing the feature for the first block and the feature for the second block; and
aligning at least a portion of the first color channel with at least a portion of the second color channel based on the estimated displacement.

20. The apparatus of claim 19 further comprising a memory for storing the aligned portion of the first color channel of the image.

21. The apparatus of claim 19 further comprising:
a modulator for modulating a signal with the aligned portion of the first color channel of the image.

22. The apparatus of claim 19 further comprising:
a demodulator for demodulating a signal that includes the first color channel of the image.

23. The apparatus of claim 22 wherein:
the first color channel of the image that is included in the signal is an encoded version of the first color channel, and
the apparatus further comprises a decoder for decoding the encoded version of the first color channel and providing a decoded version of the first color channel to the one or more processors.

24. An apparatus comprising:
means for calculating a feature for a first block of pixels in a first color channel of an image, the feature for the first block being independent of pixel values in a second color channel of the image;
means for calculating the feature for a second block of pixels in a second color channel of the image, the feature for the second block being independent of pixel values in the first color channel;
means for estimating displacement between the first color channel and the second color channel by comparing the feature for the first block and the feature for the second block; and
means for aligning at least a portion of the first color channel with at least a portion of the second color channel based on the estimated displacement.

25. A non-transitory processor readable medium having stored thereon instructions for causing one or more processors to collectively perform:
- calculating a feature for a first block of pixels in a first color channel of an image, the feature for the first block being independent of pixel values in a second color channel of the image;
- calculating the feature for a second block of pixels in a second color channel of the image, the feature for the second block being independent of pixel values in the first color channel;
- estimating displacement between the first color channel and the second color channel by comparing the feature for the first block and the feature for the second block; and
- aligning at least a portion of the first color channel with at least a portion of the second color channel based on the estimated displacement.

* * * * *